United States Patent

Kosaka et al.

[15] 3,641,507

[45] Feb. 8, 1972

[54] ELECTRONIC TEACHING APPARATUS

[72] Inventors: Masahiro Kosaka; Tadamasa Fujita, both of Osaka, Japan

[73] Assignee: Matsushita Electric Industrial Co., Ltd., Osaka, Japan

[22] Filed: Dec. 3, 1969

[21] Appl. No.: 881,766

[30] Foreign Application Priority Data

| | | |
|---|---|---|
| Dec. 6, 1968 | Japan | 43/90683 |
| Dec. 9, 1968 | Japan | 43/91266 |
| Dec. 10, 1968 | Japan | 43/92151 |

[52] U.S. Cl. .......... 340/172.5, 35/35 C

[51] Int. Cl. .......... G06k 17/00, G09b 5/04, G09b 19/04

[58] Field of Search .......... 340/174.1, 172.5; 35/35 C; 179/100.2

[56] References Cited

UNITED STATES PATENTS

| | | | |
|---|---|---|---|
| 3,199,226 | 10/1965 | Joslow | 35/35 C |
| 3,234,666 | 2/1966 | Cooper | 35/35 C |
| 3,280,271 | 10/1966 | Meyer | 179/100.2 |
| 3,405,461 | 10/1968 | Joslow | 35/35 C |
| 3,423,850 | 1/1969 | Snepvangers | 35/35 C |
| 3,426,339 | 2/1969 | Rich et al. | 340/174.1 |
| 3,484,955 | 12/1969 | Lippert | 35/35 C |

*Primary Examiner*—Gareth D. Shaw
*Assistant Examiner*—Jan E. Rhoads
*Attorney*—Wenderoth, Lind & Ponack

[57] ABSTRACT

An electronic teaching apparatus. The apparatus comprises a reproducing means for reproducing an instructional tape which has an instructional program recorded intermittently thereon, and a plurality of practice tape recorders for recording and reproducing oral responses of a plurality of learners.

A first detecting means is provided for generating a detecting signal upon the occurrence of reproduction of one part of said instructional program, and a first control means coupled to said first detecting means for controlling said practice tape recorders and a memory means after receiving said detecting signal from said first detecting means. A second detecting means is provided for generating and detecting signal upon the occurrence of reproduction of one part of said instructional program and is coupled to a second control means for controlling said instructional tape recorder and said practice tape recorders after receiving said detecting signal from said second detecting means.

The memory means stores a value of the time interval between the detecting signal from said first detecting means and the detecting signal from said second detecting means, and produces a control pulse after a time which is the same as said time interval stored in said memory means.

5 Claims, 20 Drawing Figures

INVENTORS
MASAHIRO KOSAKA
TADAMASA FUJITA

BY Wenderoth, Lind & Ponack
ATTORNEYS

INVENTORS
MASAHIRO KOSAKA
TADAMASA FUJITA

BY Wenderoth, Lind & Ponack
ATTORNEYS

INVENTORS
MASAHIRO KOSAKA
TADAMASA FUJITA

BY Wenderoth, Lind & Ponack
ATTORNEYS

INVENTORS
MASAHIRO KOSAKA
TADAMASA FUJITA

BY Wenderoth, Lind & Ponack
ATTORNEYS

INVENTORS
MASAHIRO KOSAKA
TADAMASA FUJITA

BY Wenderoth, Lind & Ponack
ATTORNEYS

INVENTORS
MASAHIRO KOSAKA
TADAMASA FUJITA

BY Wenderoth, Lind & Ponack
ATTORNEYS

INVENTORS
MASAHIRO KOSAKA
TADAMASA FUJITA

BY Wenderoth, Lind & Ponack
ATTORNEYS

INVENTORS
MASAHIRO KOSAKA
TADAMASA FUJITA

BY Wenderoth, Lind & Ponack
ATTORNEYS

INVENTORS
MASAHIRO KOSAKA
TADAMASA FUJITA

BY Wenderoth, Lind & Ponack
ATTORNEYS

INVENTORS
MASAHIRO KOSAKA
TADAMASA FUJITA

BY Wenderoth, Lind & Ponack
ATTORNEYS

ELECTRONIC TEACHING APPARATUS

This invention relates generally to a teaching apparatus using tape recorders, and more particularly to a language-teaching apparatus in which an instructional tape recorder and practice tape recorders operate alternatively for efficient learning of a foreign language.

In learning a foreign language, it is considered to be quite useful for a learner to hear an instructional program repeatedly and to make oral responses to said instructional program. An it is also quite effective for a learner to hear his own recorded oral response immediately after a termination of oral responses.

This repetitive hearing and speaking make it possible for a learner to understand and grasp an instructional program and to form proper linguistic habits in a foreign language.

The instructional tape recorder referred to herein is one in which the instructional program recorded on a magnetic tape is reproduced. Besides recording and reproducing, the instructional tape recorder can be rewound at a speed similar to that in a conventional recording and reproducing operation.

The instructional tape recorder is controlled by supplying a positive impulse to a control terminal, such as the stop control terminal, the reproducing control terminal and so on.

A control impulse causes the instructional tape recorder to carry out the corresponding operation, and the condition corresponding to this operation is maintained until another control impulse is supplied.

The practice tape recorder referred to herein is one in which the spoken response of a learner as well as the instructional program from the instructional tape recorder is recorded and reproduced. The operation of the practice tape recorder is similar to that of the instructional tape recorder except for a quick-reproducing function explained as follows.

The quick-reproducing function of said practice tape recorder referred to herein is one in which the oral response of the learner recorded on the magnetic tape is reproduced immediately after a termination of a recording, by means of a mechanism which measures the length of tape travel during a recording condition and rewinds the magnetic tape by a length the same as the measured length for quick reproducing of the recorded oral response of the learner.

Generally an instructional program is recorded on a magnetic tape with intervals between two succeeding parts of the instructional program which in practice are composed of words or phrases.

When a learner studying foreign languages with a conventional teaching apparatus wants to hear his oral response made during the time interval, he has to record his oral response with the practice tape recorder and reproduce his recorded oral response after the tape of the practice tape recorder is rewound in order to compare his oral response with the instructional program for a better understanding of his response.

The conventional teaching apparatus thus requires the learner to carry out intricate and frequent operations of the practice tape recorder during study. Such operations are, however, troublesome and prevent the efficient study of a foreign language.

It is an object of the present invention to provide a language-teaching apparatus capable of eliminating these difficulties and inconveniences.

It is an object of the invention to provide a teaching apparatus which makes it possible for learners to study foreign languages easily and efficiently.

It is a further object of the invention to provide a teaching apparatus with which learners can hear recorded instructional programs and respond to said instructional programs without carrying out any manual operations.

It is a still further object of the invention to provide a teaching apparatus with which learners can respond to recorded instructional programs while their responses are automatically being recorded on a practice tape recorder for comparison of their responses with the instructional programs.

These and other objects will become apparent from the following detailed description taken together with the accompanying drawings, wherein.

Figure 11:
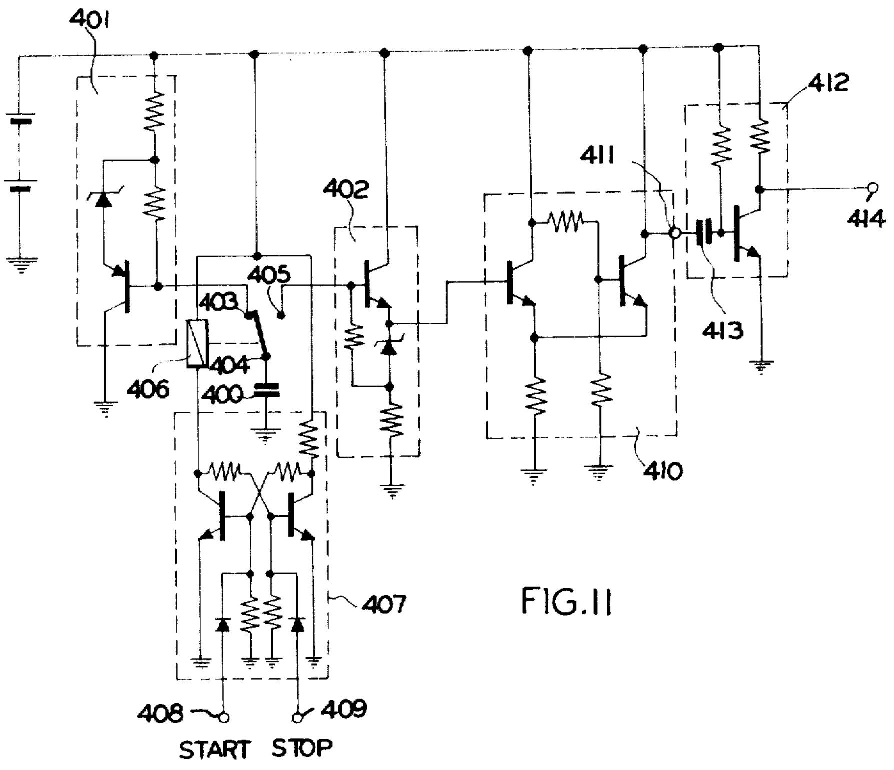
FIG. 11 is a schematic diagram of an electronic memory means which memorizes the time interval between a start impulse and a stop impulse and generates an impulse after the same interval as the time interval stored in the memory means.
Figures 12A, 12B, 12C:
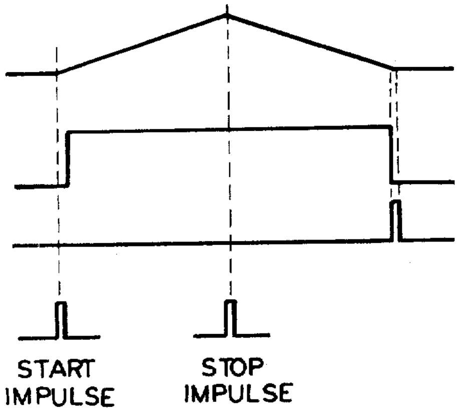
Figure 15:
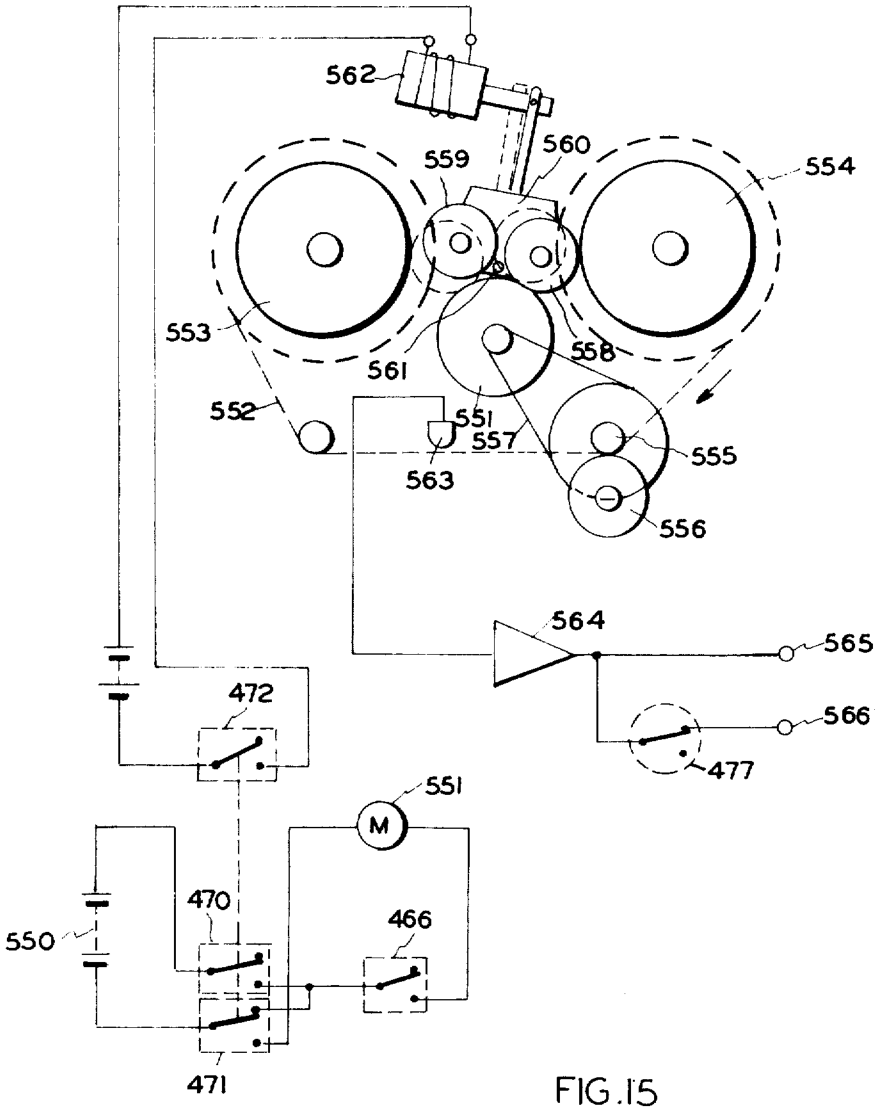
Figure 18:
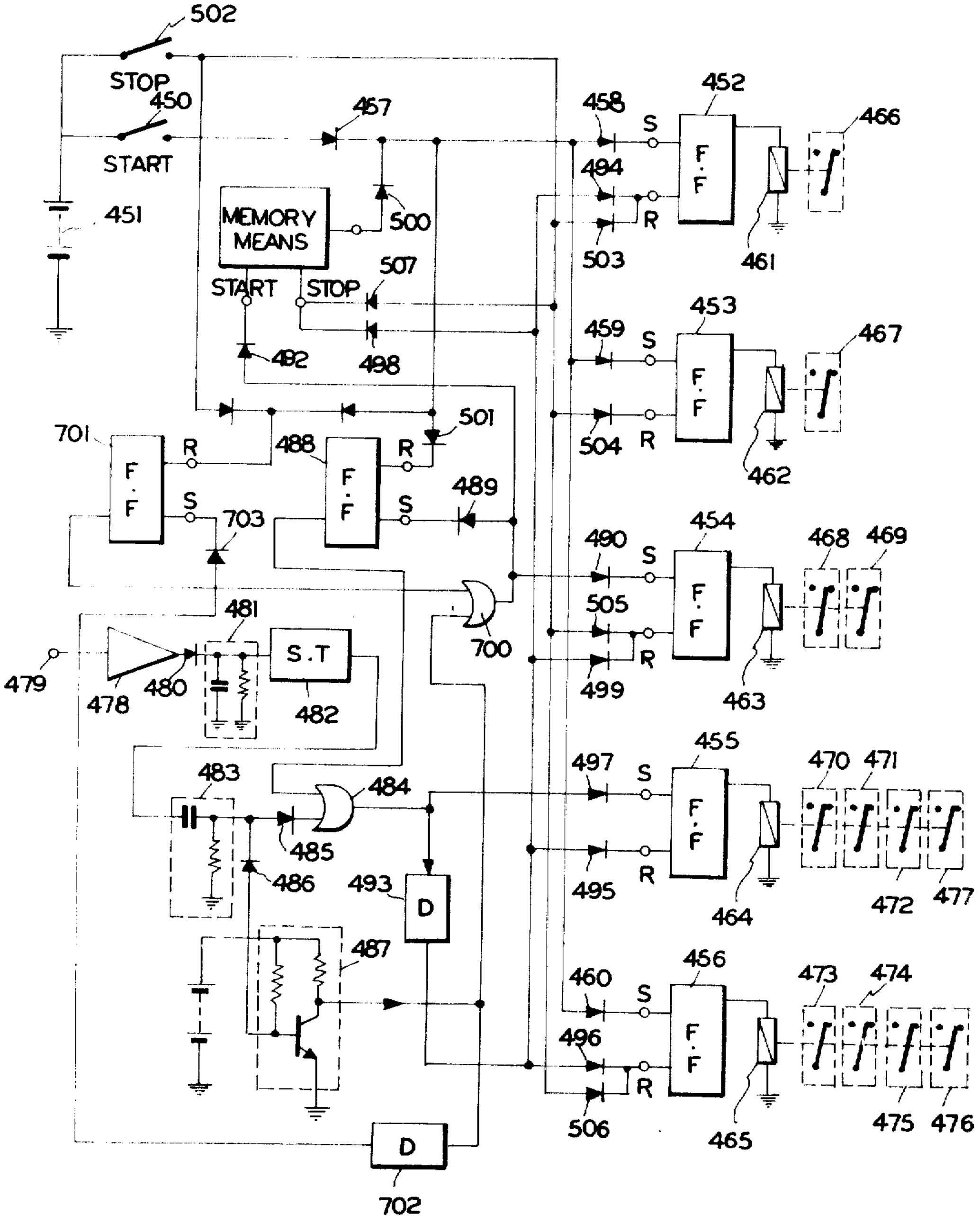
Figure 16:
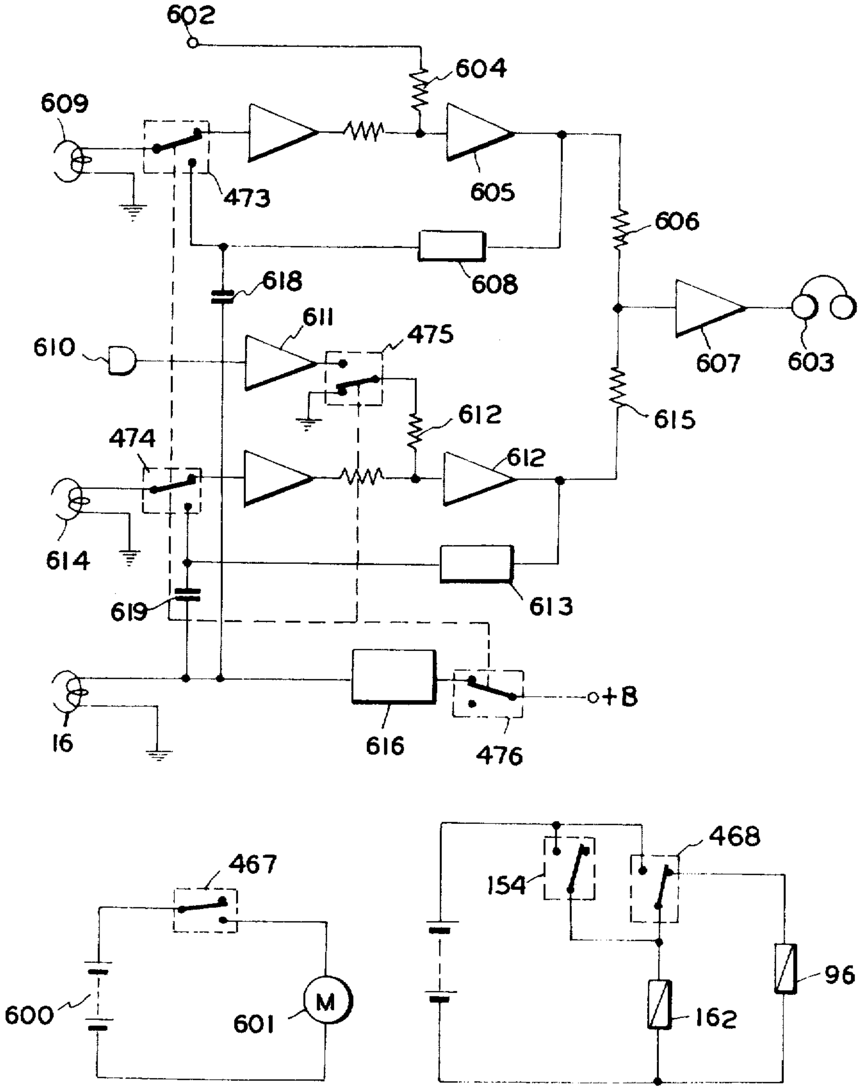
Figure 13:
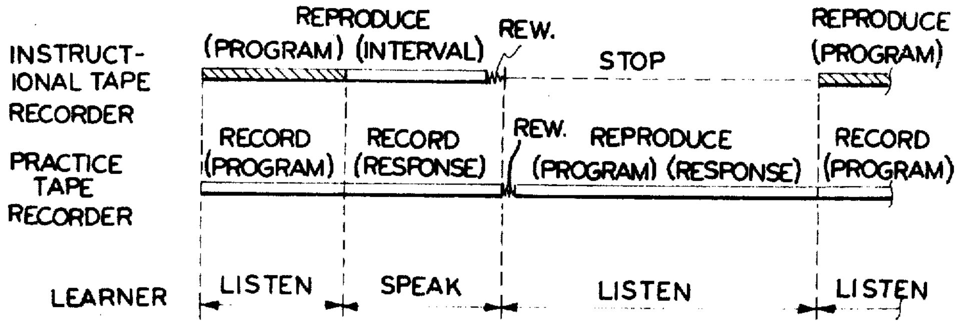
Figure 17:
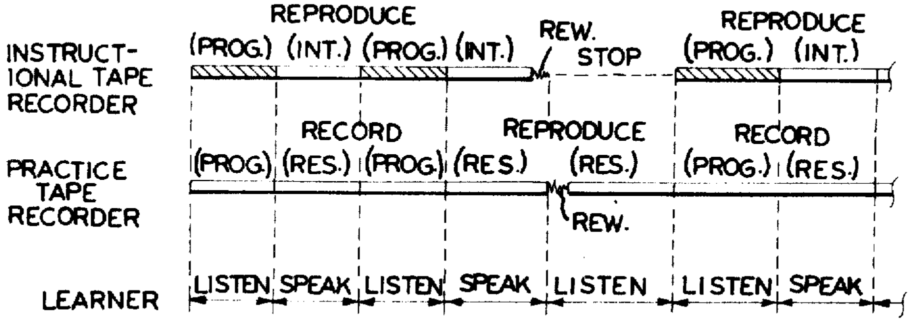
Figure 14:
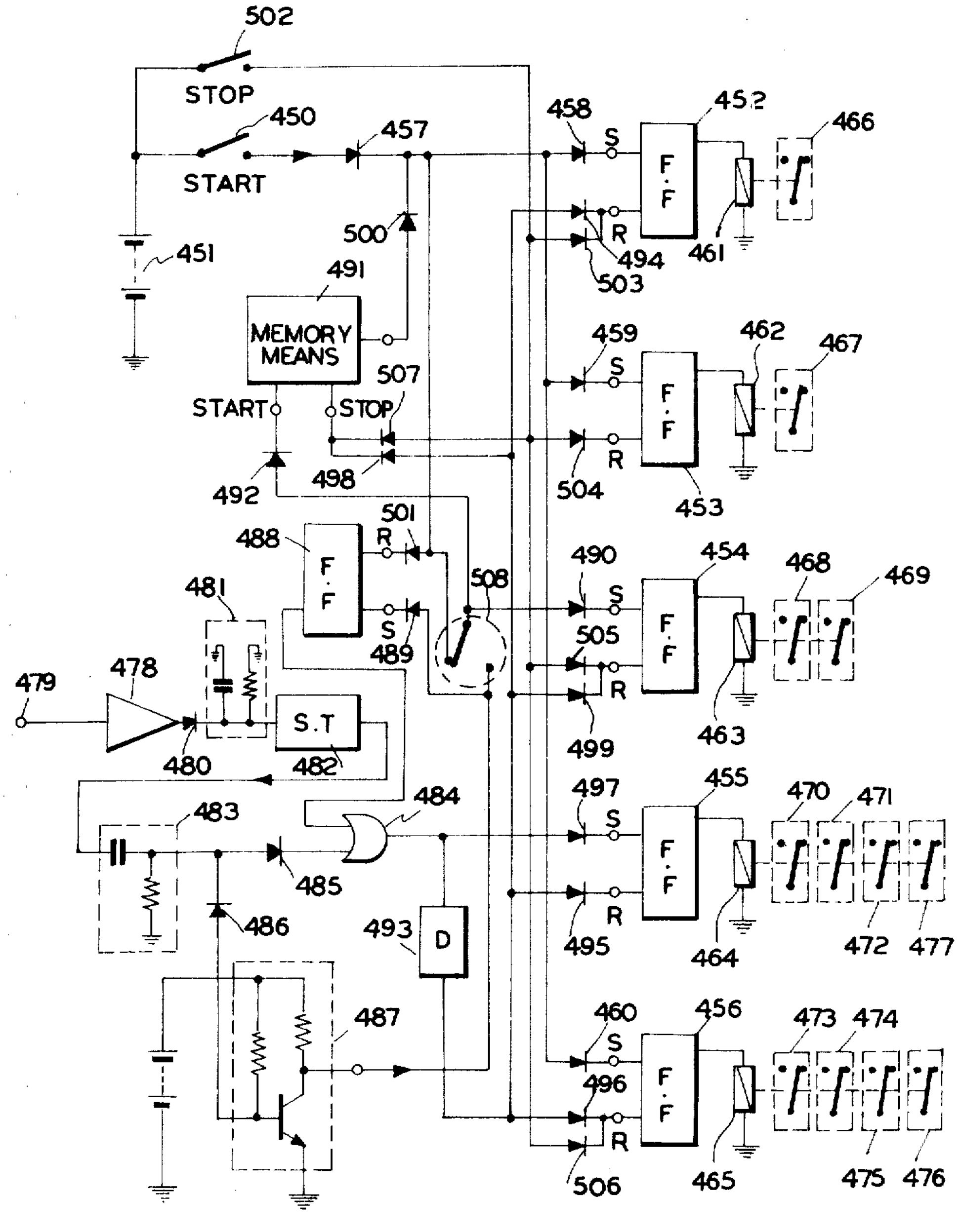

FIGS. 12*a*, 12*b* and 12*c* are waveform patterns of signals of the memory means shown in FIG. 11;

FIG. 13 is a sequence diagram of a preferred sequence of steps in a language-learning process;

FIG. 14 is a schematic diagram of an automatic control circuit of a preferred embodiment of the invention for carrying out the sequence of FIG. 13 and in which a learner's response is recorded into and reproduced from a practice tape recorder automatically;

FIG. 15 is a schematic illustration of simplified mechanical construction and electrical circuits of an instructional tape recorder carrying an instructional program used in the present invention;

FIG. 16 is a schematic diagram of an electrical circuit of a practice tape recorder used in the present invention;

FIG. 17 is a sequence diagram of a preferred sequence of steps in a language-learning process;

FIG. 18 is a schematic diagram of a preferred embodiment of the invention for carrying out the sequence of FIG. 17.

Figure 1:
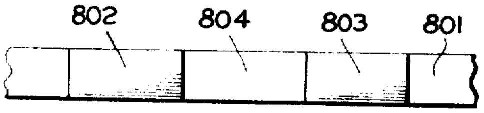
FIG. 1 is a schematic view of an instructional tape which has parts of an instructional program successively recorded thereon with moderate length blank intervals therebetween to make it possible for learners to make their oral responses within the time of these blank intervals.

Referring now to the drawings, and more particularly to FIG. 1, the instructional tape 801 shown therein has the parts 802 and 803 of an instructional program recorded successively at suitable intervals 804 so as to enable a learner to finish his oral responses within this interval.

Figure 2:
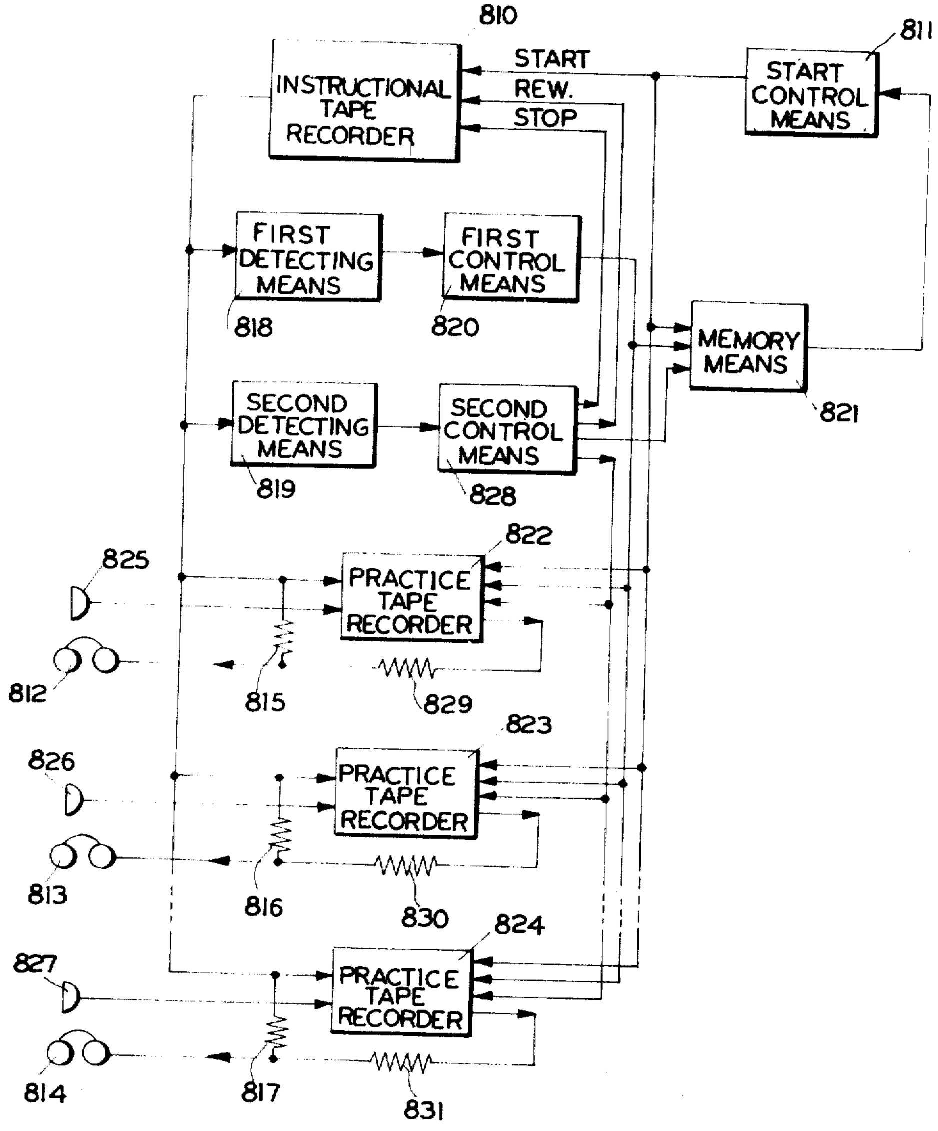
FIG. 2 is a schematic diagram of a fundamental electrical circuit of an electronic teaching apparatus according to the invention.

Before proceeding with a detailed description of the invention, the essence of the invention will be explained with reference to FIG. 2, which shows a circuit diagram of a fundamental electrical circuit of the teaching apparatus.

An instructional tape recorder 810, having instructional material recorded intermittently in a group of parts of an instructional programs on the tape thereof, is set for a reproducing operation by depressing a start button of a start control means 811.

Then the instructional tape recorder 810 reproduces the first part of the instructional program. The audio signal representing this part of the recorded instructional program is fed to a plurality of headphones 812, 813 and 814 through respective mixing resistors 815, 816 and 817 which correspond to the respective headphones 812, 813 and 814, and is simultaneously fed to a first detecting means 818 and a second detecting means 819.

The detecting means 818 and 819 referred to herein consist essentially of a combination of a rectifying circuit, an integrating circuit, a Schmitt trigger circuit, and a differentiating circuit, which will be explained later with reference to FIG. 14.

However, the detecting means contemplated by the invention is not limited to this specific combination.

Upon being rectified by a diode in the first detecting means 818, the audio signal from the instructional tape recorder 810 is smoothed by the integrating circuit in the first detecting means 818 and is fed to the Schmitt trigger circuit in the first detecting means 818.

The Schmitt trigger circuit is characterized by two stable output levels: when the input signal level to the Schmitt trigger circuit is low, the output level stays at the lower stable level; and when the input signal level increases and exceeds a certain predetermined level, the output level jumps abruptly to the higher stable level; and when the input level decreases to a certain predetermined level, the output level drops abruptly to the lower stable level.

Therefore, when said instructional tape recorder 810 starts reproduction of the parts of the instructional program, the output signal from the integrating circuit in the first detecting means 818 is caused to decrease to a certain predetermined level in association with the detecting circuit. Then, the output level of the Schmitt trigger circuit in the first detecting means 818 drops to the lower stable level and remains there while said instructional tape recorder 810 is reproducing the instructional program.

When the part of the reproduced instructional program is finished, the output signal from the integrating circuit is caused to increase and exceed a certain predetermined level. Then, the output level of the Schmitt trigger circuit in the first detecting means 818 jumps abruptly to the higher stable level.

The abrupt jump of the output level of the Schmitt trigger circuit in the first detecting means 818 is differentiated by the differentiating circuit of the detecting means 818 into a positive impulse which acts as a detecting signal. This detecting signal from the first detecting means 818 is fed to a first control means 820 which is connected to a memory means 821 and to each of a plurality of practice tape recorders 822, 823 and 824 to control the memory means 821 and practice tape recorders 822, 823 and 824 in a selected order to be described hereinafter.

Each of the practice tape recorders 822, 823 and 824 has two recording-reproducing channels, and the output audio signal from said instructional tape recorder 820 is also fed to the first recording-reproducing channels of the plurality of practice tape recorders 822, 823 and 824.

Next, learners make their oral responses to the part of the instructional program which has been heard through the headphones 812, 813 and 814. These oral responses are converted into audio signals by microphones 825, 826 and 827, and are fed to the second recording-reproducing channels of said practice tape recorders 822, 823 and 824.

Upon initiation of the next part of the instructional program from said instructional tape recorder 810 after a time interval between two successive parts of the instructional program, the second detecting means 819 detects the moment of this initiation of the part of the instructional program and generates a positive impulse in a way similar to that of the first detecting means 818. This positive detecting signal from the second detecting means 819 is fed to a second control means 828 which is connected to the instructional tape recorder, the memory means and practice tape recorders 822, 823 and 824 in order to control these elements in a selected order to be described hereinafter. Reproduced signals from the second recording-reproducing channels of said practice tape recorders 822, 823 and 824 are fed to the headphones 812, 813 and 814 through respective resistors 829, 830 and 831.

The memory means 821 is connected to the start control means 811 and generates a positive pulse after a time interval the same as that between the detecting signal from first detecting means 818 and the detecting signal from second detecting means 819. This positive signal is fed to a start control means 811 in order to control said instructional tape recorder 810, said memory means 821 and said practice tape recorders 822, 823 and 824 in a selected order to be described hereinafter.

The teaching apparatus according to the invention makes it possible for learners to hear their recorded responses to the instructional program every time they make their responses without the help of a teacher.

Any circuit having functions essentially equivalent to those described above can be employed.

The practice tape recorder referred to herein operates so that a length of tape with a recorded signal thereon is rewound and reproduced automatically within a fraction of second. This operation can be achieved in many ways and the object of the present invention is not limited to a practice tape recorder having the above function.

Therefore, one example of such a tape recorder is described hereinafter. However, any practice tape recorder which functions essentially equivalent to those described above can be employed.

Figure 3:
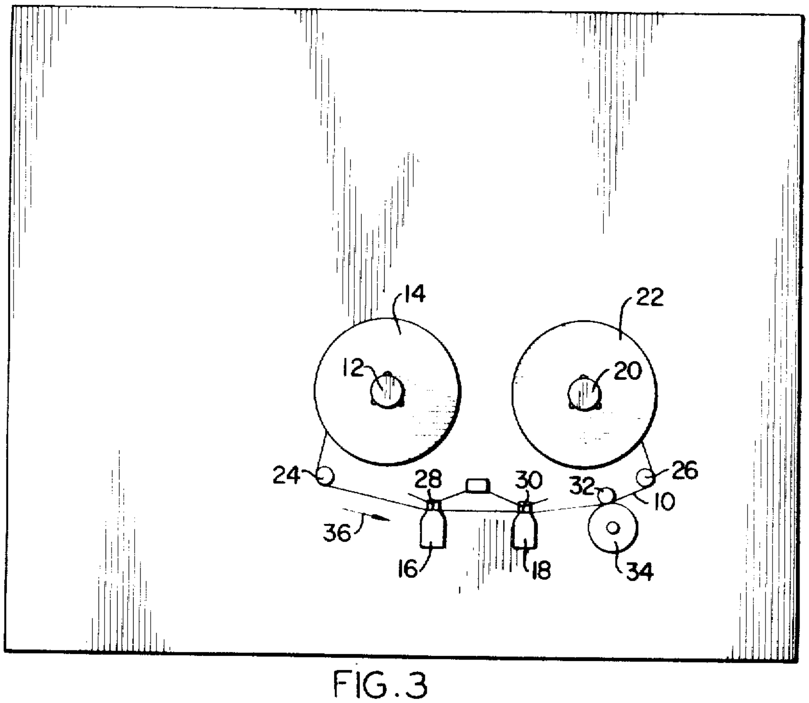
FIG. 3 is a top plan view of one embodiment of a practice tape recorder of the present invention.

Referring to FIG. 3, a magnetic tape 10 is wound on a takeup reel 22 mounted on a takeup reel roller 20 from a supply reel 14 mounted on a supply reel roller 12 through an erase head 16 and a magnetic recording-reproducing head 18.

The tape 10 is guided by guide pins 24 and 26 to move along a predetermined path, and is pressed against said heads 16 and 18 by pads 28 and 30, respectively. When it is pinched between a capstan 32 and a pinch roller 34, said tape 10 is fed so as to move at a predetermined speed in the direction designated by arrow 36.

Figure 4:
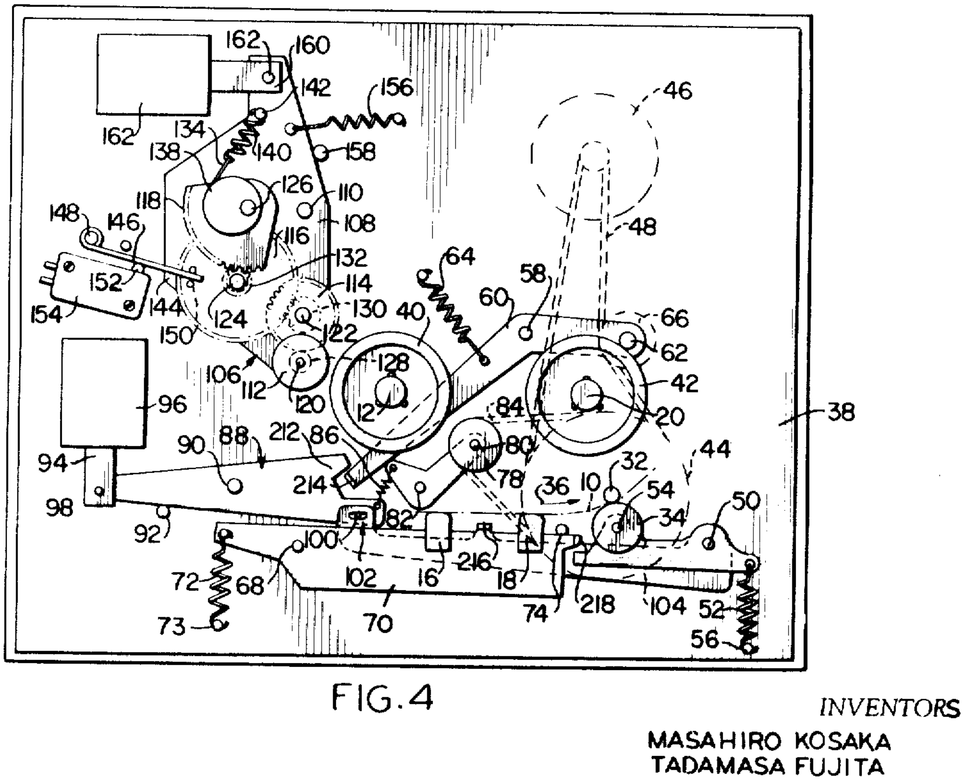
FIG. 4 is a top plan view of the apparatus of FIG. 3 with an upper pannel removed.

Referring to FIG. 4, wherein the tape-moving means is shown more fully, said reel rollers 12 and 20 are rotatably mounted on chassis 38, and have rubber tires 40 and 42 around the respective circumferences thereof.

FIG. 4 shows the apparatus of the invention with the parts in positions in which the tape-moving means is moving the tape 10 at a reproducing speed. Suitable means from the prior art is used as operating means for moving the parts of said tape moving means to the playing position. Said operating means is not an important constituent of the apparatus of the invention. Therefore the detailed description thereof has been omitted.

Said capstan 32 has a flywheel 44 coaxially secured thereto which is rotatably mounted on the chassis 38 in a suitable bearing, not shown, and is rotated counterclockwise by a motor 46 through a belt 48.

Said pinch roller 34 is rotatably mounted on a shaft 54 in turn mounted on a pinch roller arm 52 which is pivotally mounted on a shaft 50 fixedly secured on the chassis 38.

A spring 56 is connected to one end of the arm 52 biasing it in a clockwise direction in FIG. 4, so that the pinch roller 34 presses the tape 10 against the capstan 32. Therefore, the tape 10 is moved in the direction of arrow 36 by the rotation of the capstan 32.

A drive roller 62 is rotatably mounted at one end of a drive roller lever 60 which is pivotally mounted on a shaft 58 secured on the chassis 38. The lever 60 is biased to swing about the shaft 58 by a spring 64 connected thereto so as to press the drive roller 62 against the tire 42 on the takeup reel roller 20.

A friction roller 66 is coaxially connected to the drive roller 62 by a friction coupling so as to rotate with drive roller 62 while proper slip can occur between them. The friction roller 66 is engaged with the belt 48 which extends between the motor 46 and the flywheel 44, and rotates clockwise with the rotation of the motor 46. Thus said drive roller 62 is rotated in the same direction by the friction roller 66 through the friction coupling so as to drive the takeup reel roller 20 in a counterclockwise direction.

The tape 10 which is drawn off supply reel 14 by the capstan 32 and the pinch roller 34 is take up on the takeup reel 22.

The erase head 16 and the record-playback head 18 are fixed on a headplate 70 which is pivotally mounted on a shaft 68 mounted on the chassis 38. The headplate 70 is biased counterclockwise in FIG. 4 by a spring 72 which is connected between one end of said headplate 70 and a pin 73 on the chassis 38. The counterclockwise rotation of the plate 70 is limited by a stop pin 74 against which the other end of the plate 70 abuts in the reproducing position as shown in FIG. 4.

There will now be described the structure of rewind means for rewinding the tape quickly.

A rewind lever 76 is pivotally mounted on a shaft 82 on the chassis 38. A rewind roller 78 is rotatably mounted on a shaft 80 which is mounted at one end of the rewind lever 76, and is rotated counterclockwise by a belt 84 which runs between the roller 78 and the flywheel 44.

The rewind lever 76 is biased so as to swing counterclockwise by a spring 86 which is connected between the lever 76 and an actuating lever 88. Said actuating lever 88 is pivotally mounted on a shaft 90 on the chassis 38. When the actuating lever 88 is located at the position illustrated in FIG. 4, the tension of the spring 86 is not large enough to stretch the belt 84. Therefore, the rewind roller 78 does not come in contact with the rubber tire 40 of the supply reel roller 12. Accordingly a gap exists between the rewind roller 78 and the supply reel roller 12, and the rotational force of the motor 46 is not transmitted to the supply reel roller 12.

The counterclockwise rotation of the actuating lever 88 is regulated by a stop pin 92. One end of the lever 88 is connected by a pin 98 with a plunger 94 of a second solenoid 96. A pin 100 which is fixed on the other end of the lever 88 is inserted in a slot 102 formed at the end of a releasing lever 104. Said lever 104 is pivotally mounted on the shaft 50, and is above to swing in association with the actuating lever 88.

An explanation will be given of the means for memorizing mechanically the length of tape which has moved past a given point.

Figure 5:
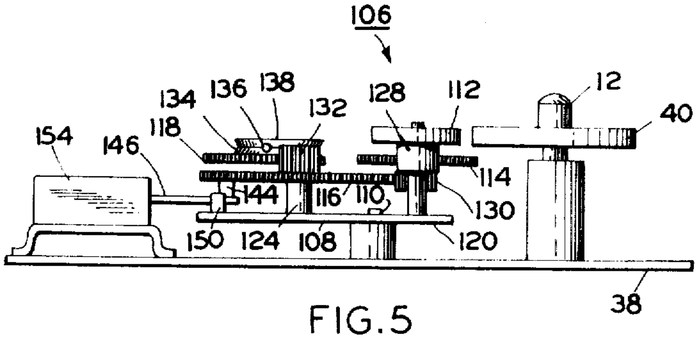
FIG. 5 is a fragmentary elevational view of the mechanical memory means of the practice tape recorder of the invention.

With reference to FIG. 4 and FIG. 5, a rotatable device 106 is assembled on a baseplate 108 which is pivotally mounted on a shaft 110 on the chassis 38. Said rotatable device 106 includes a contact roller 112, a gear wheel 114, a memory disc 116 provided with gear teeth on the circumference thereof, and a sector gear 118. These are rotatably mounted on respective shafts 120, 122, 124 and 126 which are mounted on the baseplate 108. A small gear 128 coaxial with the secured to the contact roller 112 is meshed with the gear wheel 114, and further a small gear 130 coaxial with and secured to said wheel 114 is meshed with the memory disc 116, and a still further small gear 132 coaxial with and secured to said memory disc 116 is meshed with the sector gear 118. A rope 134 extends around an annular groove of an eccentric wheel 138 which is secured to the sector gear 118, and one end of the rope 134 is fixed to a pin 136 secured to the wheel 138 and the other end thereof is fastened to a spring 140 which is anchored to a fixed pin 142 on the baseplate 108. Therefore, the memory disc 116 is biased for rotation counterclockwise by the spring 140 through the sector gear 118.

This rotation is limited by engagement of a memory pin 144 which is fixed to the lower surface of the disc 116 with a stop pin 150 on the baseplate 108 while the tip of a switch arm 146 is pinched between said memory pin 144 and said stop pin 150.

Said switch arm 146 is rotatably mounted on a shaft 148 on the chassis 38, and engages a button 152 of a microswitch 154 which acts as a detecting switch; when said tip of the switch arm 146 is pinched. Consequently the switch 154 is moved to the off position. The baseplate 108 is biased so as to rotate clockwise about the shaft 110 by a spring 156, but its rotation is limited by a stop pin 158.

Figure 7:
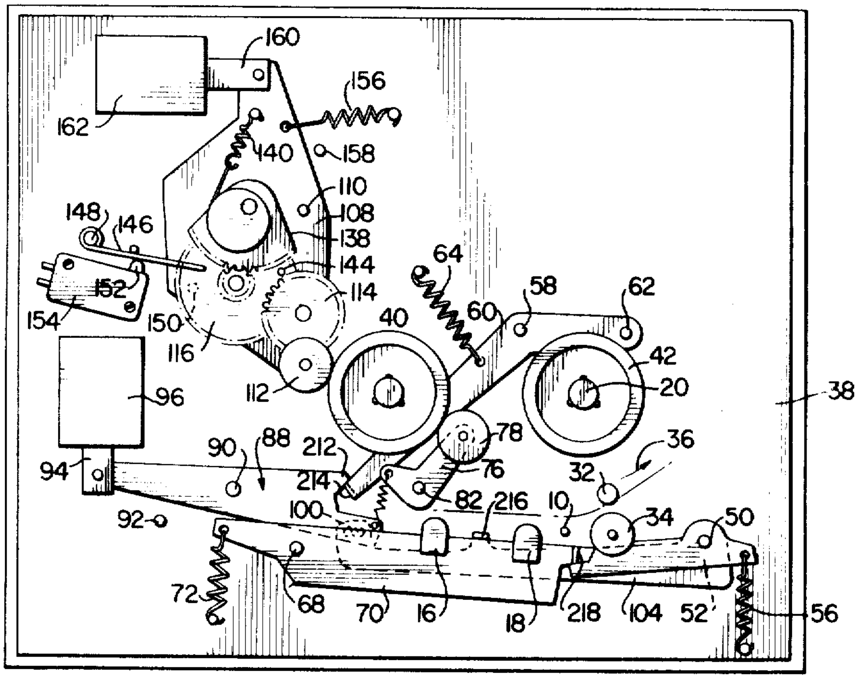
FIG. 7 is a top plan view, similar to FIG. 4, showing the practice tape recorder in its rewinding condition.
Figure 6:
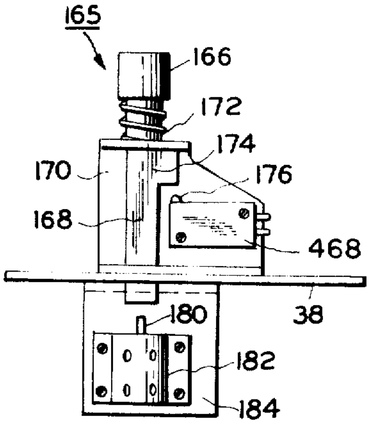
FIG. 6 is a fragmentary elevational view of an operating device forming part of the practice tape recorder of the invention.

With reference to FIG. 4, FIG. 6, and FIG. 7, there will be hereinafter explained the structure of driving means for driving said memory means.

Referring to FIG. 6, there is shown an operating device 165 mounted on the chassis 38. A pushbutton 166 is fixed to an upper end of a key 168 which is slidably supported by a supporting plate 170 secured on the chassis 38. Said button 166 is usually raised upward by a compression spring 172. When the pushbutton 166 is depressed, a projection 174 on the key 168 pushes a button 176 of a two-way microswitch 468 which is secured to the supporting plate 170, and at the same time the lower end of the key 168 pushes down an actuator 180 of a slide switch 182 which is fixed to a plate 184 secured to the lower surface of the chassis 38. When said actuator 180 of the slide switch 182 is pushed down, the electric amplifier of the apparatus of the present invention is changed from the reproducing state to the recording state.

Referring again to FIG. 4, one end of the baseplate 108 is connected with a plunger 160 of a first solenoid 162 by a pin 164.

Figure 10:
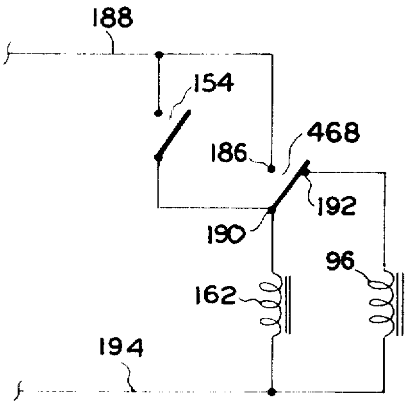
FIG. 10 is a diagrammatic illustration of electrical control circuit used in the practice tape recorder of the invention.

Referring now to FIG. 10 which shows a control circuit for operating the above-described structure, one contact of the switch 154 and a normally open contact 186 of the switch 468 are connected by a lead 188. The other contact of the switch 154 and a common contact 190 of switch 468 are connected with the first solenoid 162. A normally closed contact 192 of the switch 468 is connected with the second solenoid 96. Said solenoids 96 and 162 are also connected by a lead 194. Said leads 188 and 194 are connected with a source of DC power.

Figure 8:
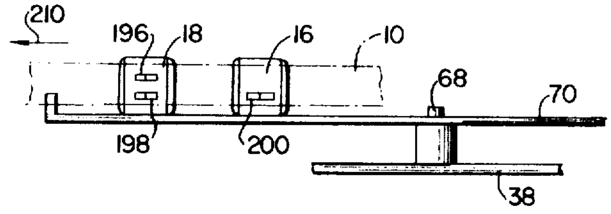
FIG. 8 is a fragmentary elevational view showing the alignment of magnetic heads used in the practice tape recorder of the invention.
Figure 9:
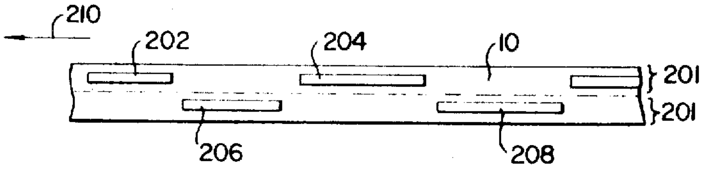
FIG. 9 is a fragmentary elevational view of a tape used in the practice tape recorder of the invention.

The playback head 18 has two head tips 196 and 198 as shown in FIG. 8, and the erase head 16 has one head tip 200 which is at the same level as said head tip 198. The tape 10 which is used in this apparatus has, for example, two recording tracks 201 and 203 as shown in FIG. 9. On the upper track 201, the instructor's questions have already been recorded as phonetic signals 202, 204 and so on, spaced properly from each other. These can be reproduced by the upper head tip 196 of the head 18. Said head tip 196 is connected with an electric amplifier which is always in a reproducing state.

On the lower track 203 of the tape 10 can be recorded the student's answers as phonetic signals 206, 208 and so on, while the recorded signals which have been recorded previously are being erased.

In operation, as shown in FIG. 3, the tape 10 is moving in the direction of the arrow 36 at a predetermined speed (in FIG. 8 and FIG. 9 the tape is moving in the direction of the arrow 210).

After hearing the instructor's questions on the tape the student depresses the pushbutton 166 in FIG. 6. The depression causes the slide switch 182 to switch the electric amplifier connected with the head tips 198 and 200 from the reproducing state to the recording state. At the same time, the microswitch 468 has the common contact 190 connected with the normally opened contact 186 so as to energize the first solenoid 162 in FIG. 10. Referring to FIG. 4, upon energization of the solenoid 162 the plunger 160 is moved towards the left to swing the baseplate 108 counterclockwise about the shaft 110. As a result the contact roller 112 is pressed against the outer periphery of the rubber tire 40 on the supply reel roller 12.

With the tape moving in the direction of the arrow 36, the supply reel roller 12 is rotating counterclockwise. Therefore the contact roller 112 starts to rotate clockwise so that the memory pin 144 moves away from the switch arm 146. This allows the switch arm 146 to swing counterclockwise, and the bottom 152 of the microswitch 154 moves out, being spring-biased. The switch 154 in FIG. 10 is closed at this time.

When the student speaks his answer into a microphone, his voice is recorded on the tape 10 as phonetic signal 206 in FIG. 9.

With the parts in the positions described above, the memory disc 116 continues its rotation corresponding to the tape moving.

When the student removes his finger from the pushbutton 166 after he has finished speaking his answer, the pushbutton 166 moves upward and the slide switch 182 changes the head tips 198 and 200 from the recording state to the reproducing state. Upon restoration of the pushbutton 166, the button 176 of the microswitch is biased back to its normal position and the common contact 190 is connected with the normally closed contact 192 as shown in FIG. 10. As previously described, the microswitch 154 has already been closed so that both the solenoids 96 and 162 are supplied with electric power.

Upon energization of the solenoid 96, the plunger 94 thereof is actuated to swing the actuating lever 88 clockwise as shown in FIG. 7. A projection 212 on the lever 88 pushes a bent-over tab 214 on the drive roller lever 60 so as to swing the lever 60 counterclockwise. As a result the drive roller 62 is moved away from the rubber tire 42 on the takeup reel roller 20. On the other hand the pin 100 on the lever 88 drives the releasing lever 104 counterclockwise about the shaft 50. A bent-over tab 216 on said releasing lever 104 pushes the head-plate 70 clockwise about the shaft 68 so that the heads 16 and 18 are separated from the tape 10. Further a bent-over tab 218 at the right-hand end of the headplate 70 pushes the pinch roller arm 52 counterclockwise so as to separate the pinch roller 34 from the capstan 32. On the other hand the clockwise rotation of the actuating lever 88 extends the spring 86. In response to an increase in the tension of the spring 86 the rewind lever 76 swings counterclockwise and the rewind roller 78 is pressed against the rubber tire 40 of the supply reel roller 12. As mentioned above the rewind roller 78 is rotated counterclockwise by the belt 84.

Consequently, the supply reel roller 12 rotates clockwise and pulls the tape 10 at a rapid speed in the direction opposite to the arrow 36 so as to rewind the tape 10 on the supply reel 14.

This rotation of the supply reel roller 12 makes the contact roller 112 rotate counterclockwise, and also makes the memory disc 116 rotate counterclockwise. As long as there is no slip between the rubber tire 40 of the supply reel roller 12 and the contact roller 112, the tape 10 will be rewound to the point where the desired recording is started when the memory pin 144 just reaches the stop pin 150. At this time the memory pin 144 pushes the switch arm 146 against the stop pin 150 so that said arm 146 depresses the button 152 of the microswitch 154. The switch 154 in FIG. 7 is opened to break the circuit to the solenoids 96 and 162 at the same time.

As shown in FIG. 4, the baseplate 108 swings clockwise about the shaft 110 under the biasing force of the spring 156 so as to separate the contact roller 112 from the rubber tire 40 on the supply reel roller 12. Further, the actuating lever 88 swings counterclockwise under the biasing force of the spring 86 so as to separate the rewind roller 78 from said rubber tire 40. At the same time the drive roller lever 60 swings clockwise under the biasing force of the spring 64 so as to engage the drive roller 62 with the rubber tire 42 of the takeup reel roller 20. Further, the headplate 70 swings counterclockwise under the biasing force of the spring 72 so as to contact the heads 16 and 18 with the tape 10. Still further, the pinch roller arm 52 swings clockwise under the biasing force of the spring 56 so as to press the pinch roller 34 against the capstan 32. Consequently, the tape 10 moves at a predetermined speed in the direction of the arrow 36, and the phonetic signal 206 (in FIG. 9) which the student has recorded is reproduced from the beginning thereof.

On hearing the tutor's questions the student can record his answers in the manner described above. As soon as recording is finished, the tape is rewound automatically to the point where the desired recording is started and the answer that the student gave is reproduced.

By making the rewinding speed of the tape 20 to 30 times larger than the recording or reproducing speed of the tape, the rewinding is achieved substantially instantaneously especially when the answers recorded are short. As soon as the student has his voice recorded on the tape, what the student has spoken is reproduced.

The electronic teaching apparatus, which will be described hereinafter, uses the aforesaid tape recorder as a practice tape recorder together with another tape recorder and electric control circuitry.

Referring now to FIG. 11, an example of a memory means used in the present invention is shown. As described previously, the memory means referred to herein stores a value of a time interval between two impulses supplied to a start terminal and a stop terminal of the memory means shown in FIG. 11, and generates a positive impulse at an output terminal of the memory means after an elapse of a time interval the same as the time interval stored in the memory means.

This kind of memory means can be constructed either mechanically or electrically according to a specific requirements.

Referring again to FIG. 11, an electric capacitor 400 is used as a memory device to which constant current source 401 and constant current drain 402 supply positive and negative constant current, respectively.

The memory capacitor 400 is selectively connected to a constant current source 401 or a constant current drain 402 by transfer relay contacts 403, 404 and 405. The relay 406 is driven by a flip-flop circuit 407. When a positive impulse is applied to start terminal 408, the relay 406 is energized and the movable contact 404 is switched to the fixed contact 403 from the other fixed contact 405. Then the voltage across the memory capacitor 400 is caused to increase linearly in proportion to time as shown in FIG. 12(A). After a while, a positive impulse supplied to the stop terminal 409 deenergizes relay 406, and consequently the movable contact 404 is switched back to the fixed contact 405. Then, the constant current drain 402 is connected to the memory capacitor 400 in order to linearly decrease the voltage across the memory capacitor 400 in the manner as shown in FIG. 12A.

This change in the voltage across the memory capacitor 400 is supplied to the aforesaid Schmitt trigger circuit which is shown at 410 in order to derive a voltage change having a form as shown in FIG. 12B. The voltage at the output terminal 411 of the Schmitt trigger circuit 410 is caused to jump abruptly to a higher stable level when the voltage across the memory capacitor 400 is increased to a certain predetermined level by charging current from the constant current source 401, and is caused to drop abruptly to a lower stable level when the voltage across the memory capacitor 400 is decreased to a certain predetermined level by discharging current from the constant current drain 402. The output signal from the Schmitt trigger circuit 410 is supplied to a pulse amplifier 412 through a differentiating capacitor 413 in order to differentiate the abrupt drop of the output signal from the Schmitt trigger circuit 410 and the pulse amplifier generates a positive impulse having the form shown in FIG. 12C at output terminal 414 of the pulse amplifier 412.

As is clearly apparent from the description above, the memory means stores a value of the time interval between start impulse and stop impulse and generates a positive impulse after the a time interval same as the time interval stored when the current values of the constant current source 401 and the constant current drain 402 are properly selected.

With reference to FIGS. 13, 14, 15 and 16, there will be hereinafter explained an embodiment and operation of an automatic teaching apparatus of the present invention.

Referring to FIG. 13, a sequence diagram of an operation of both an instructional tape recorder and a practice tape recorder is represented, in which a part of an instructional program as well as an oral response of a learner is recorded by and reproduced from a practice tape recorder.

In this operation, a magnetic tape in the practice tape recorder is rewound automatically up to a point at which the recording of the part of the instructional program reproduced from the instructional tape recorder is initiated, and consequently, the magnetic tape is reproduced.

Therefore, a learner can compare his recorded oral response with the corresponding part of the instructional program every time when he terminates his oral response to the instructional program. First, the instructional tape recorder reproduces a part of the instructional program so that a learner can hear this part of the instructional program through his headphone and simultaneously the memory means starts its memory operation and simultaneously said instructional program is recorded on said practice tape recorder.

Then, the instructional tape recorder is rewound at a speed similar to that of the reproducing operation when the blank interval between two successive parts of the instructional program has passed and the next part of the instructional program has started to reproduce. A little while, possibly 1 or 2 seconds, later, the instructional tape recorder is stopped and simultaneously the practice tape recorder is caused to start its reproducing operation following the recording operation and the memory means also stops it storing operation. Then the magnetic tape on which a learner's oral response together with said instructional program is recorded is rewound quickly to the point where the instructional program recording is initiated, and is set to carry out a reproducing operation in order to make it possible for the learner to hear his oral response compared with said instructional program immediately after he has terminated his oral response for efficient learning.

After the recorded instructional program and said oral response of the learner has been reproduced, the memory means generates a positive impulse in order to reproduce the next part of the instructional program for the next learning activity.

Referring to FIG. 14, which shows a diagram of the automatic control circuit of the present invention, a study start switch 450 is closed momentarily and a voltage from a voltage source 451 is applied to flip-flop circuits 452, 453, 490 and 456 at their set terminals through diodes 457, 458, 459, 490 and 460 in order to set these flip-flop circuits 452, 453, 454 and 456, and simultaneously start a storing operation of the memory means 491 through a diode 492. The, relays 461, 462, 463 and 465 are energized and these relays 461, 462, 463 and 465 switch their transfer contact 466, which is in the instructional tape recorder, and contacts, 467, 468, 469, 473, 474, 475 and 476 which are in the practice tape recorder, in order to achieve the following operation. Then, the solenoid 162 of the practice tape recorder is energized, and the amount of a magnetic tape which moves starts to be measured and the measured amount stored by said memory means.

Referring now to FIG. 15, which shows the essential parts of the construction of the instructional tape recorder, a magnetic tape 552 is wound on a supply reel 553 and a takeup reel 554 and is pinched between a capstan 555 and a pressure roller 556 in order to drive a magnetic tape 552 past a magnetic reproducing head 563 in a forward or reverse direction.

The driving motor 551 drives the capstan 555 through a belt 557 and the supply reel 553 and takeup reel 554 selectively through rubber idlers 558 and 559 mounted on a plate 560 which is pivotally mounted on pin 561 and which is rocked back and forth by a solenoid 562.

First the instructional tape recorder is set to a reproducing operation by connecting a voltage source 550 to run in a driving motor 551.

Upon depressing the study start switch 450 the transfer contact 467 of the relay 462 is also closed in order to apply a voltage source 600, as shown in FIG. 16, to a driving motor 601 of a practice tape recorder, and simultaneously the transfer contacts 473, 474, 475 and 476 are switched for changing the practice tape recorder from reproducing operation, in which the parts are as shown in FIG. 16, to recording operation.

Then, a part of the instructional program recorded on the magnetic tape 552 is reproduced by the magnetic reproducing head 563, and the reproduced signal is applied to a program input terminal 602 of the practice to tape recorder (FIG. 16) through an amplifier 564, the relay contact 477 and an output terminal 566 of the instructional tape recorder (FIG. 15), and simultaneously this reproduced signal is fed from terminal 565 to a detecting amplifier 478 of the control circuit (FIG. 14) through a terminal 479 thereof. The instructional program applied to the part of the input terminal 602 of the practice tape recorder is supplied to a headphone 603 through a mixing resistor 604, an amplifier 605, a mixing resistor 606 and a monitor amplifier 607 for a learner to hear this part of the instructional program, and is simultaneously recorded on the magnetic tape of the practice tape recorder through a recording equalizer circuit 608, the relay contact 473 and a magnetic recording-reproducing head 609. The part of the instructional program amplified by the detecting amplifier 478 in the control circuit is rectified by a diode 480 and smoothed by an integrating circuit 481 including a resistor and a capacitor and is fed to a Schmitt trigger circuit 482.

Upon receipt of the signal from the integrating circuit 481, the output signal of the Schmitt trigger circuit 482 jumps abruptly to a higher stable level from a lower stable level and this abrupt jump is differentiated, by a differentiating circuit 483 including a capacitor and a resistor, into a positive impulse. This positive impulse is fed to a logical AND-gate 484 which is in the OFF condition through a diode 485.

After being kept at the higher stable level, the output signal of the Schmitt trigger circuit 482 drops abruptly to a lower stable level when the part of the instructional program is finished. Then, a negative impulse is generated by the differentiating circuit 483 and is inverted to a positive impulse through a diode 486 and a pulse inverting circuit 487. This positive impulse, which is generated when one part of the instructional program is finished, sets flip-flop circuits 488 and 454 through diode 489.

A learner's response replying to the part of the instructional program is recorded on the magnetic tape 10 of the practice tape recorder through a microphone 610, an amplifier 611, a mixing resistor 612 an amplifier 650, a recording equalizer 613, and a magnetic recording-reproducing head 614. Simultaneously the learner can hear his voice through a mixing resistor 615, an amplifier 607 and a headphone 603.

These two magnetic recording-reproducing heads 609 and 614 are shown as one recording-reproducing head 18 in FIG. 3.

As shown in FIG. 16, a bias frequency signal generated by a bias frequency oscillator 616 is supplied to both magnetic recording-reproducing head 609 and 614 through capacitors 618 and 619, respectively, and to a magnetic erasing head 16 for erasing a previously recorded signal on the magnetic tape.

After the time interval has passed, the instructional tape recorder starts to reproduce the next part of the instructional program at the output terminal 565. Then, the Schmitt trigger circuit 482 again generates a signal having a higher stable level and produces a positive impulse in association with the differentiating circuit 483. This positive impulse sets the flip-flop circuit 455 through a diode 497 and the logical AND-gate 484 which is opened when the flip-flop circuit 488 is set by the pulse from the pulse inverting circuit 487, and simultaneously is supplied to a delay circuit 493 which in practice consists of a monostable multivibrator having a delay time of about 1 second. Then, the relay contacts 470 and 471 are switched, and consequently, the driving motor 551 turns in the opposite direction, and the relay contacts 472 are switched to energize the solenoid 562. Therefore, the magnetic tape 552 and associated mechanism move in opposite directions as indicated by the dashed arrows in FIG. 15. After the time defined by the delay circuit 493, a positive impulse generated from the delay circuit 493 resets flip-flop circuits 452, 454, 455 and 456 through diodes 494, 499, 495 and 496, respectively in order to deenergize corresponding relays 461, 463, 464 and 465.

Simultaneously, this positive impulse stops the storing operation of the memory means 491 by being supplied to the memory means 491 through a diode 498.

Then, the instructional tape recorder stops and the practice tape recorder changes its operation from a recording operation to a reproducing operation through a rewinding operation in order to reproduce immediately the learner's oral response to the instructional program.

Therefore, a learner can hear his oral response immediately after a termination of his response automatically without a manual operation. Thus, the instructional tape recorder reproduces the learner's oral responses each time he terminates his oral responses.

After a time interval the same as that between the start impulse to said memory means and the stop impulse, the memory means generates a positive impulse for setting the flip-flop circuits 452, 453 and 456 and for resetting the flip-flop circuit 488 through diodes 500, 458, 459, 460 and 501. Then, the instructional tape recorder starts again reproducing the next part of the instructional program, with all flip-flop circuits in this automatic control circuit being thus reset for subsequent operation. Thus said memory means 491 starts a storing operation again.

The automatic operation can be stopped by depressing a reset switch 502 whenever it is necessary to stop operation. Then, the positive voltage source 451 is supplied to flip-flop circuits 452, 453, 454 and 456 through diodes 503, 504, 505 and 506, respectively, and to the stop terminal of the memory means 491 through a diode 507.

In the teaching apparatus described above, the instructional tape recorder and the practice tape recorder are controlled automatically, in the selected order, by the automatic control circuit in order to proceed to teach a language easily and efficiently.

Therefore, a language teacher and a learner can direct their attention to the learning activity itself, which will make the learning activity efficient.

Referring now to FIG. 15, 16, 17 and 18, a further embodiment of the present invention will be described for a case when an immediate reproduction of either a part of an instructional program or an oral response of a learner from the practice tape recorder is carried out alternatively.

In the art of language education, an instructional program sometimes takes the form of questions and answers, a so-called "four-cycle study" which requires learner's oral responses.

The "four-cycle study" is necessary when cultivation of a learner's ability to construct his own answer to a given instruction rather than merely mimicking the instruction is required, and a recorded response of a learner is reproduced immediately.

A still further embodiment of the present invention will be described for a case where both an instructional program and a learner's response are reproduced automatically in such a "-four-cycle study".

In this embodiment, a second part of said instructional program is recorded by and reproduced from said practice tape recorder together with said learner's response.

This "four-cycle study" is started, as represented in FIG. 17, by reproduction of a part of an instructional program from an instructional tape recorder and this is followed by the learner's answer. Then, a learner hears a correct answer reproduced from the instructional tape recorder, and next, the learner repeats the correct answer just heard.

According to the present invention, only the repeated response of the learner is reproduced immediately because an automatic reproduction of the learner's answer which is sometimes incorrect will disrupt a successful learning activity.

Referring to FIG. 18, which shows a circuit diagram of a system for carrying out such a study sequence as described above, and in which parts similar to those of FIG. 14 have the same numerals, depression of a study start switch 450 causes the instructional tape recorder to be driven so as to reproduce the tape, and a learner can hear the first part of the instructional program. Next, when reproduction of the first part of the instructional program ends, the Schmitt trigger circuit 482 produces, in association with the differentiating circuit 483 and the pulse-inverting circuit 487, a first positive impulse, said first positive impulse being stopped by a logical AND-gate 700 which opens when a flip-flop circuit 701 is in the set condition. Subsequently this first positive impulse sets the flip-flop circuit 700 through a delay circuit 702 and a diode 703. This delay circuit 702 generates a positive impulse for setting the flip-flop circuit 701 to open the logical AND-gate 700 after the first positive impulse from the pulse-inverting circuit 487 is finished. Thus, the first positive impulse, generated when reproduction of the first part of the instructional program ends, doesn't affect the operations of the instructional tape recorder and the practice tape recorder.

Next, a learner answers the question just hear while a magnetic reproducing head of the instructional tape recorder is scanning a blank length of tape between two successive parts of the instructional program as shown in FIG. 1. When the instructional tape recorder starts the reproduction of the next part of the instructional program which is a correct answer to the previous question, the Schmitt trigger circuit 482 generates a positive impulse in association with the differentiating circuit 483. This positive impulse is also stopped by the logical AND-gate 484 because the flip-flop circuit 488 is in a reset condition.

Therefore, as described above, the first half of one study sequence, which includes a reproduction of the question from the instructional tape recorder and the oral answer made by the learner, doesn't effect the operation of the instructional tape recorder and the practice tape recorder except for setting the flip-flop circuit 701.

Next, at a termination of the reproduction of the correct answer from the instructional tape recorder, a positive impulse generated, in association with the differentiating circuit 483 and the pulse inverting circuit 487, by the Schmitt trigger circuit 482 sets the flip-flop circuits 488 and 454 through diodes 489 and 490, respectively and starts a storing operation of the memory means 491 as previously described with reference to FIG. 14. The operation from then on is the same as that described with reference to FIG. 14 where the recorded learner's response is recorded and reproduced immediately.

After the reproduction of the learner's repeated response, a positive impulse is generated from the memory means 491. This positive impulse resets the flip-flop circuit 701 through a diode 704. At the same time, the positive impulse starts the instructional tape recorder in a reproducing operation and operates the proper flip-flop circuits for commencement of a new study sequence as described with reference to FIG. 14.

In the teaching apparatus described above, both an instructional tape recorder and a practice tape recorder are controlled selectively by an automatic control circuit.

One skilled in the art can construct a control circuit which performs a function conceived in said embodiment of present invention, referring to aforesaid description taken together with appropriate figures.

In practice, two control circuits shown in FIG. 14 and FIG. 18 can be combined together with appropriate modification in order to obtain the function of said embodiment of the present invention.

One can easily envision another embodiment of the present invention; a plurality of learners can carry out their learning activity by using an embodiment which includes a plurality of practice tape recorders and shares one instructional tape recorder and one automatic control circuit. In this case, a plurality of practice tape recorders have operations similar to each other as described with reference to FIG. 14 and FIG. 18.

Although preferred embodiments of the invention have been set forth in detail, it is desired to emphasize that they are not intended to be exhaustive or necessarily limitative; on the contrary, the disclosure herein is for the purpose of illustrating the invention and thus to enable others skilled in the art to adapt the invention in such ways as meet the requirements of particular applications, it being understood that various modification can be made without departing from the scope of the invention.

What is claimed is:

1. An electronic teaching apparatus comprising, in combination, an instructional tape recorder for reproducing an instructional tape which has a plurality of parts of an instructional program recorded intermittently thereon, at least one practice tape recorder having as a part thereof means for rewinding a tape therein with information recorded thereon by said practice tape recorder to the place where the recording of said information was initiated and for automatically reproducing said information by operating said practice tape recorder for reproducing, a first detecting means coupled to said instructional tape recorder for generating a detection signal upon the occurrence of a reproduction of the parts of said instructional program, a first control means coupled to said first detecting means and to said practice tape recorder for controlling said practice tape recorder in response to said detecting signal from said first detecting means, a second detecting means coupled to said instructional tape recorder for generating a detection signal upon the occurrence of a reproduction of the parts of said instructional program, a second control means coupled to said second detecting means, said instructional tape recorder and said practice tape recorder for controlling said instructional tape recorder and said practice tape recorder in response to said detecting signal from said second detecting means, a memory means coupled to said first control means, said second control means and said instructional tape recorder for storing a value of a time interval between a signal from said first control means and a signal from said second control means and to produce a signal for controlling said instructional tape recorder after the elapse of an interval of time the same as the interval stored in said memory means, and start control means coupled between said memory means and said instructional tape recorder for controlling said instructional tape recorder and said practice tape recorder to start said tape recorders when said memory means generates said signal.

2. An electronic teaching apparatus as claim in claim 1 wherein said second control means includes means connected to said memory means for producing a control signal for starting said instructional tape recorder in a rewinding operation when one part of said instructional program has started and means connected to said instructional tape recorder for producing a further control signal for stopping said instructional tape recorder after one or two seconds for the purpose of obtaining a reproduction of said one part of said instructional program from the beginning when said instructional tape recorder is controlled for subsequent reproducing.

3. An electronic teaching apparatus as claimed in claim 1 wherein said instructional tape recorder has a rewind terminal and a stop terminal to which said second control means is connected, said second control means including means for producing a rewind start signal, a rewind stop signal a few seconds later, and a memory stop signal and said memory means having a stop terminal to which said second control means is connected, and said practice tape recorder has a record terminal to which said first control means is connected, and a quick rewind terminal to which said second control means is connected, whereby the control signal from said memory means actuates said start control means and starts said instructional tape recorder in a reproducing operation, and said practice tape recorder in a recording operation when said time interval, the value of which is stored in said memory means, has passed, and the rewind start signal from said second control means starts said instructional tape recorder in a rewinding operation, and said memory stop signal stops the memory function of said memory means when one part of said instructional program has started and said rewind stop signal subsequently stop said instructional tape recorder after a few seconds.

4. An electronic teaching apparatus as claimed in claim 1 wherein said instructional tape recorder has a rewind terminal and a stop terminal to which said second control means is connected, said second control means including means for producing a rewind start signal, a rewind stop signal a few seconds later, and a memory stop signal and said memory means having a stop terminal to which said second control means is connected, and has a start terminal to which said first control means is connected, and said practice tape recorder has a record terminal to which said first control means is connected, and a quick rewind terminal to which said second control means is connected, whereby the control signal from said memory means actuates said start control means and starts said instructional tape recorder in a reproducing operation when said time interval, the value of which is stored in said memory means, has passed, and the control signal from said first control means starts said practice tape recorder in a recording operation, and starts the memory function of said memory means when two parts of said instructional program have been reproduced, and the rewind start signal from said second control means starts said instructional tape recorder in a rewinding operation and said rewind stop signal subsequently stops said instructional tape recorder after a few seconds, and the rewind start signal starts said practice tape recorder in a quick rewind operation, and said memory stop signal stops the memory function of said memory means when one part of said instructional program has been started.

5. An electronic teaching apparatus as claimed in claim 4 wherein the second control means includes means for producing a start signal for starting the practice tape recorder and a memory start signal for starting the memory means only after the second part of the instructional program has started, whereby the practice tape recorder start signal from said second control means starts said practice tape recorder in a recording operation, and the memory start signal starts the memory function of said memory means when the second part of said instructional program has started.

* * * * *